UNITED STATES PATENT OFFICE.

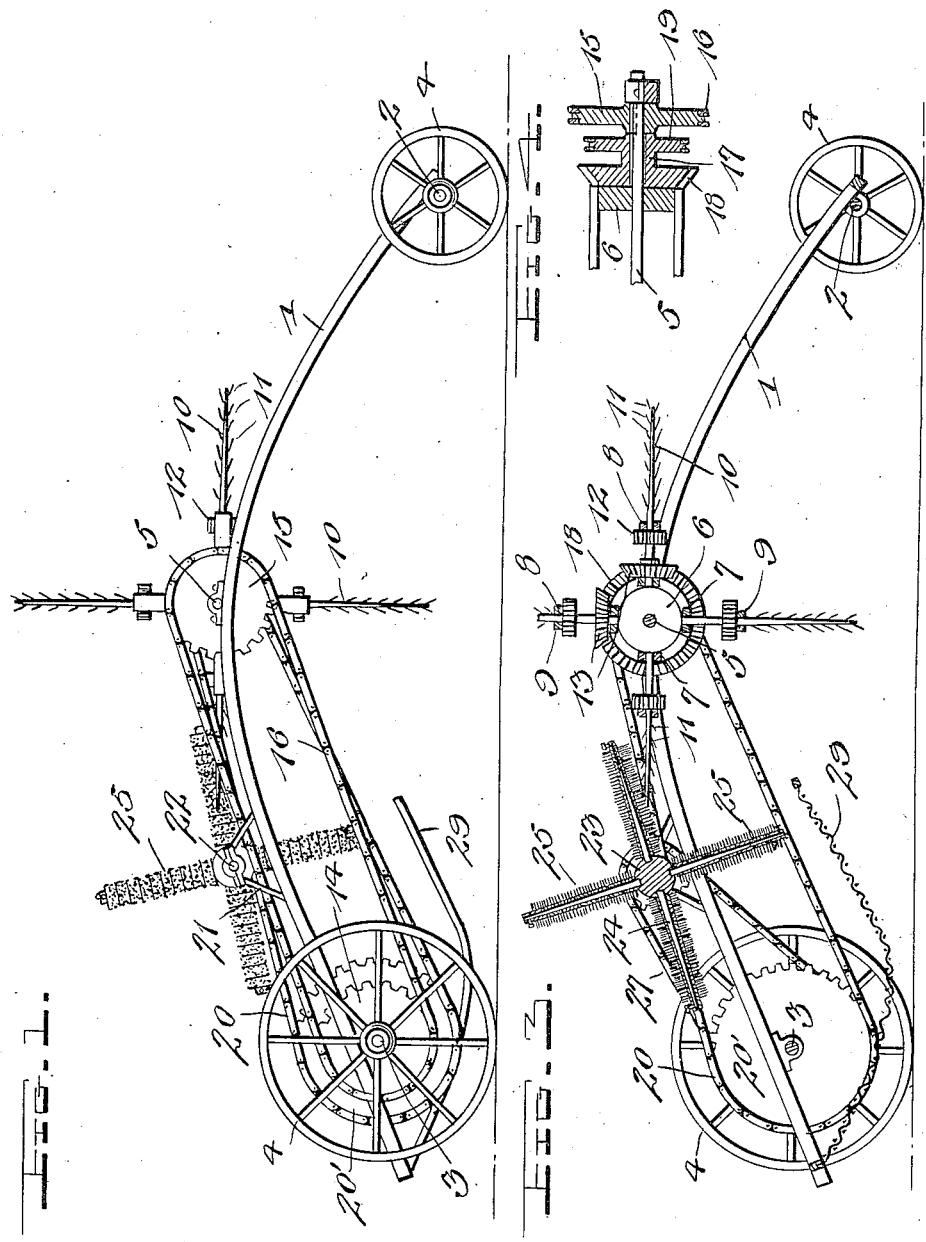

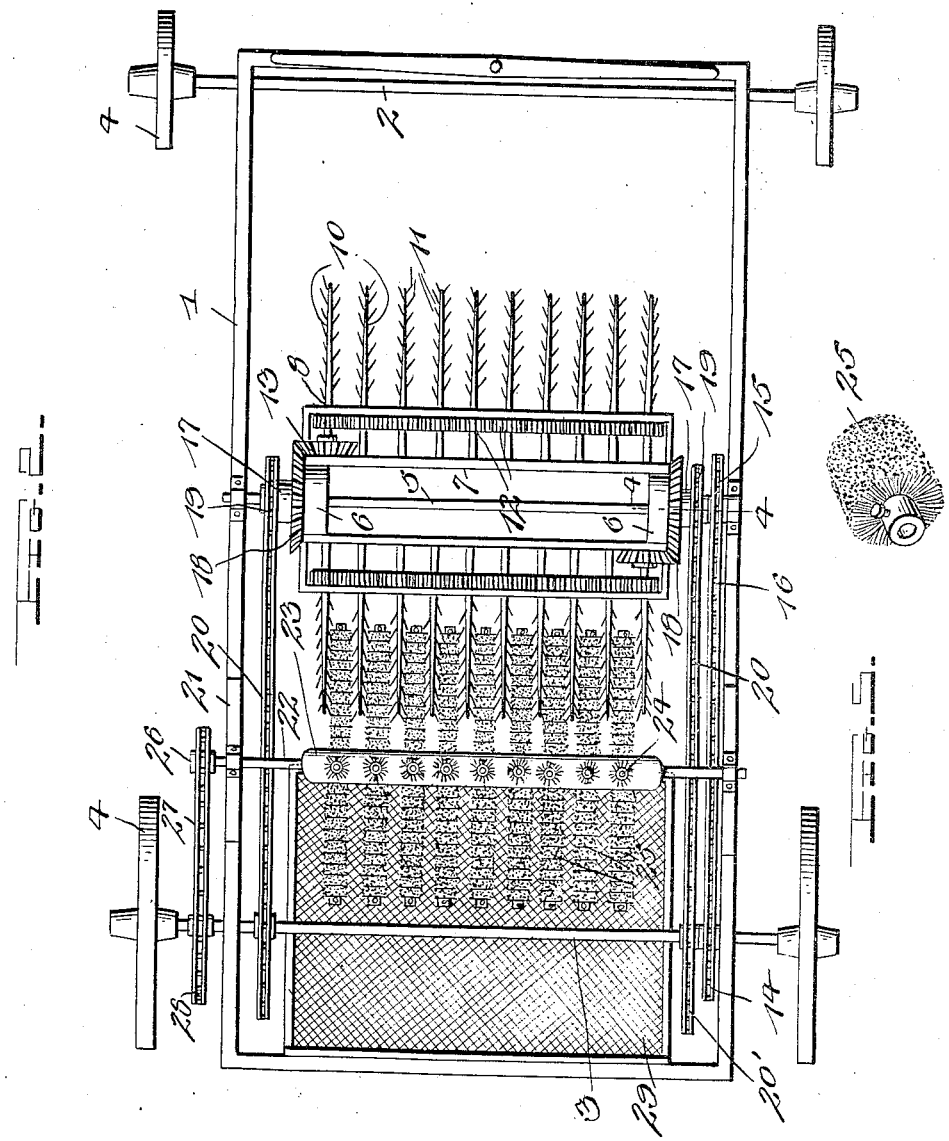

RICHARD C. TEEL, OF GOOD WATER, ALABAMA.

COTTON-PICKER.

1,067,691.  Specification of Letters Patent.  Patented July 15, 1913.

Application filed August 17, 1912. Serial No. 715,676.

*To all whom it may concern:*

Be it known that I, RICHARD C. TEEL, a citizen of the United States, residing at Good Water, in the county of Coosa and State of Alabama, have invented certain new and useful Improvements in Cotton-Pickers, of which the following is a specification, reference being had to the accompanying drawings.

My invention relates to new and useful improvements in cotton pickers and has for its object to provide a simple device of this character which will be most efficient in removing the cotton from the bolls.

A further object of the invention resides in providing a drum having a plurality of rotating picker arms thereon and a still further object resides in providing means for the rotation of said picker arms during the rotation of the drum.

Still another object of the invention resides in providing a device which is extremely simple and durable in construction and one which is comparatively inexpensive to manufacture.

With these and other objects in view, the invention consists in the novel features of construction, combination and arrangement of parts as will be hereinafter referred to and more particularly pointed out in the specification and claims.

In the accompanying drawings forming a part of this application, Figure 1 is a side elevation of the device. Fig. 2 is a top plan view thereof. Fig. 3 is a longitudinal section through the same. Fig. 4 is a vertical section as seen on line 4—4, Fig. 2; and Fig. 5 is a fragmentary perspective view of one of the brushing bars or the like.

In describing my invention, I shall refer to the drawings in which similar reference characters designate corresponding parts throughout the several views and in which 1 indicates a frame, substantially rectangular in plan, the side bars of which are slightly arched and mounted on the front and rear ends of the frame are the front and rear axles 2 and 3 respectively, which carry the supporting wheels 4.

The rear axle is designed to rotate on the frame upon the rotation of the rear wheel and rotatably mounted on the side bars of the frame 1, intermediate of their ends, is a shaft 5, which has formed thereon, the drum 6. This drum is formed by mounting a plurality of inner and outer ribs 7 and 8 respectively on said shaft 5, the inner ribs alining with the outer ribs, said ribs being provided with alining openings 9 therein and extending through these alining openings 9 and designed to rotate therein are the rows of tapering spindles or the like 10. These spindles 10 have the portions thereof extending from the outer ends to the outer ribs 8 provided with inclined prongs or teeth 11, thereby forming picker arms of these spindles 10 and each of said spindles is provided thereon, immediately below the outer ribs 8, with a pinion 12 meshing with the pinions of the adjacent spindles or picker arms. There may be as many sets of ribs on the drum as desired, it being understood that for every set of ribs, there will be a row of spindles and one end spindle of each row has a beveled pinion 13 mounted on the inner end thereof, the purpose of which will be hereinafter and more particularly described.

The shaft 5 carrying the drum with the spindles thereon is adapted to be rotated on the frame upon the rotation of the rear axle 3, said axle and shaft being respectively provided with the sprockets 14 and 15 over which extends a chain 16 and mounted on the shaft 5 at each end of the drum thereon is a collar 17, the one end of which has a bevel gear 18 mounted thereon and the opposite end of which carries a sprocket 19. The bevel gears 18 mesh with the bevel pinions 13 carried on the end spindles of said drum, it being understood that successive rows of spindles have these pinions 13 disposed at opposite ends thereof, and the sprockets 19 have the chains 20 extending thereover which also extend over the enlarged sprockets 20′, keyed to the rear axle 3. It will thus be seen that upon the rotation of the rear axle, the shaft 5 will be caused to rotate, thereby rotating the drum and the bevel gears 18 will also be caused to rotate on the shaft 5 at a faster rate of speed than the latter, thereby causing the rows of spindles or picker arms to be rotated in the drum at the proper rate so that the fingers will gather the cotton.

Rotatably mounted on sets of brackets 21, in the rear of the above referred to drum, is an additional shaft 22 carrying a cylindrical member or drum 23 and radiating from this cylindrical member 23 are a plurality of outwardly tapering arms 24, which arms are arranged alternate of the spindles 10 on the aforesaid drum. These brackets 21 are so arranged that the free ends of the arms 24, when in their lowermost position, are disposed in the same horizontal plane as the axis of said drum and mounted on the arms 24 are a plurality of disk brushes 25. As the arms 24 are disposed alternate of the spindles 10, it will be seen that the disk brushes 25 will be disposed between the pairs of spindles to remove the cotton from the picking portions of the picking arms or spindles 10 and in order to cause the shaft 22 to be rotated, a sprocket 26 is mounted thereon over which extends a chain 27, said chain also extending over an additional sprocket 28 keyed to the rear axle 3. Mounted on the rear end of the frame 1 below the rear axle 3, is an apron 29 which is adapted to receive the cotton as the same is removed from the picker arms by the brushing members.

In operation, the machine is driven by any desired power over a row of cotton and with the rotation of the rear axle, the drum carrying the picker arms or spindles 10 is caused to rotate and said picker arms are simultaneously caused to rotate within the drum. The rotation of the spindles or picker arms will cause the cotton to be twisted from the bolls and as the drum is rotated, the picker arms or spindles are brought into position to allow the brushing members to remove the cotton therefrom and pass the same to the apron 29 in the rear end of the frame of the device. This operation is continued throughout each row until the complete field has been covered.

From the foregoing it will be seen that I have provided a device which is extremely simple and durable in construction, inexpensive to manufacture and one which will be very efficient and useful in operation; and while I have particularly described the elements best adapted to perform the functions set forth, it is obvious that various changes in form, proportion and in the minor details of construction may be resorted to without departing from the spirit or sacrificing any of the principles of the invention.

Having thus described this invention what I claim is:—

1. In a cotton picker, the combination with a frame; of a drum comprising a central shaft and inner and outer peripheral bars arranged in connection therewith, a plurality of picker arms rotatably mounted in said inner and outer peripheral bars and arranged in series on the drum, means to rotate said drum, means to rotate one picker arm of each series simultaneous with the rotation of said drum, the last mentioned picker arms of successive series being rotated in opposite directions, and additional means to rotate the remaining picker arms of each series from the last referred to means.

2. In a cotton picker, the combination with a frame; of a drum mounted thereon comprising a central shaft rotatably mounted on the frame and inner and outer peripheral bars arranged in connection with said central shaft, a plurality of picker arms rotatably mounted in the inner and outer peripheral bars of said drum and arranged in series thereon, means to rotate said drum, additional means to rotate opposite end picker arms of successive series thereof simultaneous with the rotation of said drum and in opposite directions to one another, and a pinion carried on each of said picker arms between the peripheral bars in said drum, each pinion being in mesh with the adjacent pinion, whereby all of said picker arms will be simultaneously rotated.

3. In a cotton picker, the combination with a frame; of a drum comprising a central shaft rotatably mounted on the frame, and inner and outer peripheral bars arranged in connection with said shaft, a plurality of picker arms rotatably mounted in the inner and outer peripheral bars of said drum and arranged in series thereon, bevel gears carried at opposite ends of said drum, bevel pinions carried on the picker arms, at opposite ends of successive series thereof and meshing with the adjacent bevel gears of the drum, connecting means between the end picker arms and the remaining picker arms of each series, whereby to rotate each series of picker arms as the drum is rotated, and means to rotate said drum.

In testimony whereof I hereunto affix my signature in the presence of two witnesses.

RICHARD C. TEEL.

Witnesses:
S. L. MOORE, Jr.,
E. P. DOBSON.